ELECTRICAL CIRCUIT FOR COMMUNICATION NETWORKS

Filed April 30, 1958

INVENTOR
L. W. HUSSEY
BY Alan C. Rose
ATTORNEY

United States Patent Office 2,946,855
Patented July 26, 1960

2,946,855

ELECTRICAL CIRCUIT FOR COMMUNICATION NETWORKS

Luther W. Hussey, Sparta, N.J., assignor to Bell Telephone Laboratories, Incorporated, New York, N.Y., a corporation of New York Filed Apr. 30, 1958, Ser. No. 731,923

13 Claims. (Cl. 179—18)

Figures 1, 2:
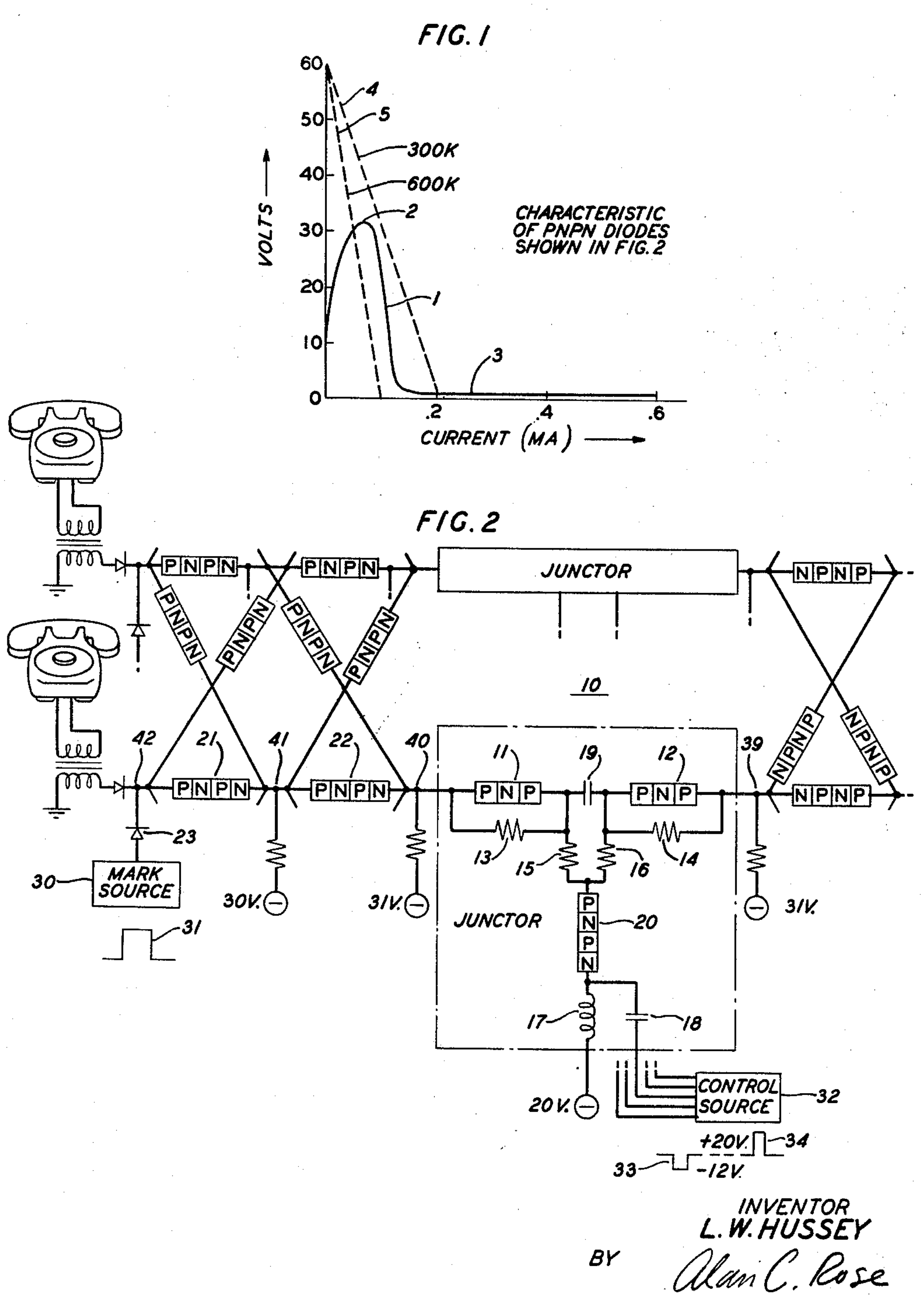

This invention relates to communication switching networks and more particularly to circuits for controlling the establishment of a transmission path through such networks.

In telephone central offices utilizing electronic switching systems, various arrangements are known employing gas tubes as crosspoints to control, or act as, transmission elements between subscriber stations. One such network is disclosed in G. E. Jacoby-J. W. Rieke Patent 2,883,470, granted April 21, 1959, which also describes the use of junctors, or bisectors, to improve the operation of a switching network. There have also been disclosed electronic switching networks employing as transmission elements, or crosspoints, certain semiconductor circuits which exhibit a breakdown characteristic for voltages or currents in excess of certain levels. One such network, for example, is disclosed in my Patent 2,876,366, granted March 3, 1959.

Various types of semiconductor devices are known in the art which exhibit breakdown characteristics suitable for electronic switching networks of telephone central offices. One such device is the PNPN crosspoint diode disclosed in W. Shockley Patent 2,855,524, granted October 7, 1958. The voltage-current characteristic of this diode exhibits a high-impedance, low-current state separated from a low-impedance, high-current state by a negative resistance region. For voltages and currents above a certain level, switching, or breakdown, of the diode from the first state to the second state occurs.

In one arrangement of such diodes in a switching network, these diodes are interconnected in successive stages to provide transmission paths through the network between particular subscribers, as desired. One way of controlling such a switching network is to use the end-marking technique, whereby the inherent characteristics of the crosspoint are utilized to establish a path through the network between a particular pair of terminals which have been "marked" by appropriate potentials.

One disadvantage of this method, particularly for systems serving a large number of subscribers and having a correspondingly large number of stages, arises from the fact that, as breakdown of the crosspoints proceeds from stage to stage in the establishment of a path through the network, a progressively larger number of crosspoints becomes conducting in each stage. These conducting crosspoints remain in the low-impedance, high-current stage until the desired connection is completed, when all but the crosspoints comprising this connection are returned to the high-impedance, low-current condition. This "fan-out," as it is called, of conducting crosspoints from a terminal toward the interior of the network imposes rather high current requirements on the marking voltage source and the crosspoints near the network terminals, since each end crosspoint must carry the current for many other conducting crosspoints in parallel. As the total fan-out current is many times the normal sustain current of a single crosspoint and since it flows only during the fraction of a second that a network path is being established, it becomes manifest that providing crosspoints capable of handling such large currents necessarily involves inefficient use of component capabilities.

One solution to this problem has been to divide the switching network into groups separated by circuits called junctors as disclosed in Patent 2,883,470, referred to above. These junctors are inserted intermediate the network terminals to provide a part of any established transmission path. They may advantageously be used to provide additional control of associated crosspoints within the network. Such a utilization of junctor circuits reduces the degree of fan-out by restricting it to each network group, as between one terminal and the junctor, rather than permitting the fan-out to proceed from end to end of the network, as before. To provide the desired control of a transmission path, the junctor circuits of such networks must perform the function of determining when a desired path is ready for completion by the junctor. In addition, junctors may be utilized in interrupting a connection, including opening the junctor path itself, upon the termination of a call.

Crosspoint devices such as are referred to above, utilized in the voice transmission portions of the switching network, are normally operated in the conducting state over a region of the voltage-current characteristic curve which exhibits some small value of positive impedance. It becomes desirable therefore to compensate for the transmission loss occurring in these devices and other lossy elements in the transmission path by introducing some element capable of operation over a controlled negative impedance region.

An object of this invention is the provision of an improved junctor circuit for use in communication switching networks.

A further object of this invention is to simplify the circuitry of switching network junctors, thereby reducing the cost and number of components and increasing the circuit reliability.

It is also an object of this invention to combine in one simple circuit the functions of providing transmission path loss compensation and automatic latching of the junctor itself.

One specific embodiment of this invention employs a PNPN breakdown diode of the type referred to above connected between the midpoint of the junctor circuit and a bias voltage source. A pair of semiconductor negative resistance devices of the type disclosed in J. J. Ebers-S. L. Miller Patent 2,915,647, granted December 1, 1959, is connected between the junctor midpoint and its two terminals which are joined to the internal terminals of the two sides of the associated switching network. These negative resistance devices exhibit a voltage-current characteristic having a minimum breakdown potential and an extended negative resistance region within which the device may be stably operated when broken down. The negative resistance devices, when broken down, form a part of the transmission path established through the network, and the function of the junctor PNPN diode is to control their breakdown.

Establishment of conduction in the PNPN device in turn is controlled by a pair of resistances which form a shunt current path between the PNPN device and the junctor terminals. These resistances are of such a value with respect to the voltage-current characteristic of the PNPN diode that marking voltages are required on both of the junctor terminals before the resistors pass sufficient current to permit the PNPN device to break down. Final switching of the PNPN device to its conducting state is accomplished by the application of a control pulse at the opposite electrode of the PNPN diode. The characteristics of the voltage breakdown devices utilized are such that, in the circuit of this specific embodiment of the invention, the junctor latches in the conducting condition and remains conducting until a second control pulse, opposite in polarity to that employed to initiate the connection, is applied to extinguish the PNPN device. In this manner, control of the transmission path is provided by the junctor circuit of the invention.

It is a feature of this invention that voltage breakdown devices determine the state of conduction of a path through a junctor in response to marking signals applied at the junctor terminals. In accordance with this feature, the voltage breakdown devices may interrupt, as well as establish, a transmission path through the junctor.

Another feature of this invention is the inclusion in a junctor circuit of voltage breakdown devices having the property of negative resistance in their operating region to provide loss compensation in the junctor transmission path.

Another feature of this invention is the use of current limiting elements in a junctor circuit to prevent a voltage breakdown device from entering its conducting state until all of these elements have been marked by appropriately applied signals.

In accordance with a further feature of the invention, a switching network of the talking path diode type includes a pair of breakdown devices connected in series between two terminals, a shunt control circuit including another breakdown device connected to a point between the two serially connected breakdown devices, and a passive impedance element connected in parallel with each of the pair of serially connected breakdown devices to permit breakdown of the shunt control circuit only when current is supplied through both of the impedance elements.

A complete understanding of this invention and of these and various other features may be gained from the following detailed description of the accompanying drawing, in which:

Fig. 1 depicts a characteristic curve for a voltage breakdown device of the type disclosed in Patent 2,855,524, referred to above; and Fig. 2 is a schematic diagram of a junctor circuit in accordance with the invention, arranged with a portion of an associated switching network.

In Fig. 1 there is shown a voltage-current characteristic curve 1 of a PNPN semiconductor diode employed in one specific embodiment of this invention. Curve 1 is shown to have a voltage peak 2 to the right of which the device passes through an unstable region to a portion 3 characterized by a low impedance and relatively high current. The portion of the curve 1 to the left of the peak 2 represents the high-impedance, low-current state of the device. Dashed lines 4 and 5 represent two different load lines for the device corresponding to series resistors having the values of 300,000 and 600,000 ohms, respectively. It can be seen that for an applied voltage of 60 volts the device having the characteristic curve 1 cannot break down with a series resistance of 600,000 ohms, since the load line 5 crosses the curve 1 to the left of its peak 2. However, for an applied voltage of 60 volts and a series resistance of 300,000 ohms the same device switches to its conducting state, since the load line 4 passes to the right of the peak 2 of the characteristic curve 1. Since two 600,000 ohm resistances in parallel are equivalent to 300,000 ohms, it can be seen that a device exhibiting the characteristic of Fig. 1 will function as a coincidence element to distinguish between the cases of having one and having both of a pair of parallel 600,000 ohm resistors connected to a 60-volt potential source.

This fact is exploited in the junctor circuit of this invention, one specific embodiment of which is depicted in Fig. 2 in combination with a portion of an electronic switching network. In this figure, the junctor 10 is shown with terminals 39 and 40 connected to the internal nodes of the switching network. Both halves of the switching network are disposed symmetrically about the junctors. For simplicity, only one junctor and one path through the left half of the switching network are shown in complete form. A second path through the left half of the network and a second junctor are shown to indicate the way in which the PNPN crosspoint diodes are interconnected. The major portion of the right half of the network has been omitted for simplicity, since both halves are symmetrical about the junctor stages.

In Fig. 2, PNPN diodes 21 and 22 are shown connected between the junctor 10 and the point 42 which represents an external terminal of the switching network proper. Suitable coupling elements connect the terminal 42 to a subscriber telephone set. Nodes 40 and 41 adjacent diode 22 are connected through resistors to negative bias voltage sources of —31 and —30 volts, respectively. Terminal 42 is connected through a diode 23 to a marking potential source 30 producing an output pulse 31 having an amplitude of 30 volts. Each of the nodes 40, 41, and 42 has multiple connections to other network paths, some of which are shown between the upper and lower paths of Fig. 2, the rest being omitted for simplicity.

The junctor circuit 10 of the figure contains a pair of negative resistance transistors 11 and 12 of the type disclosed in Patent 2,915,647 of J. J. Ebers and S. L. Miller, referred to above, connected in series between the junctor terminals. Connected as they are, these transistors furnish compensation for loss introduced by the PNPN diodes while performing the switching function required at this point. Between the two devices 11 and 12 is connected a capacitor 19 to block direct current. In parallel with devices 11 and 12 are resistors 13 and 14, respectively, each having a resistance of 600,000 ohms. Resistors 15 and 16 connect devices 11 and 12, respectively, to a terminal of PNPN diode 20 and serve to limit the current in the circuit after breakdown to a safe value. The other terminal of diode 20 is connected to a bias source of —20 volts through an inductance 17 and to a control source 32 through a capacitor 18. Control source 32 develops a negative output pulse 33 with a minimum potential of —12 volts for establishing a connection and produces a positive pulse 34 with an amplitude of +20 volts for interrupting the transmission path. Control source 32 is connected to several junctors in order to control the breakdown of a plurality of junctors within a network group. In order that control source 32 may step rapidly through a junctor group in searching for an idle junctor to complete a desired connection, pulse 33 is considerably narrower than marking pulse 31.

In describing the operation of the circuit of Fig. 2, it is assumed that a connection is to be made between the network terminal 42 and a corresponding network terminal on the opposite side of the junctor circuit 10. Establishment of a path through the network is initiated by the application of pulse 31 from mark source 30 through diode 23 to network terminal 42. This pulse, in conjunction with the bias source of —30 volts connected to node 41, is sufficient to cause diode 21 to break down. The marking signal is then passed to node 41 and, coacting with the bias source connected to node 40, breaks down diode 22. Assuming approximately a one-volt drop in potential across each of the conducting diodes 21 and 22, the node 40, which is also the left-hand terminal of the junctor 10, has applied to it a potential of approximately +28 volts.

Simultaneously with the passage of a marking signal from the network terminal 42 toward the junctor terminal 40, the corresponding portion of the switching network to the right of the junctor 10 has been going through the same procedure. Thus a second marking voltage of approximately +28 volts appears at junctor terminal 39. Also, with the application of marking signals to the network terminals, control source 32 produces pulse 33 which is applied through capacitor 18 to the lower electrode of PNPN diode 20.

It should be understood that the marking signals applied to the network terminals experience a fan-out through the respective portions of the switching network as they proceed toward the junctors at the center in the manner described above. The control source 32 steps its output pulse 33 from one to another of the junctors which may be available to complete the desired connection. Because of the way the marks proceed from the network terminals, certain of these junctors may have the mark applied to only one and not both of their terminals. Control source 32, by stepping its pulse 33 from junctor to junctor, finally reaches one which has been primed at both its terminals 39 and 40 and switches it into conduction. Any junctor which has been primed on only one of its terminals cannot conduct in response to a control pulse 33, since insufficient current passes through either of resistors 13 or 14 to permit the PNPN diode 20 to break down. If both terminals 39 and 40 of the junctor 10 are marked by positive voltages of approximately +28 volts, resistors 13 and 14 are effectively in parallel and together they pass sufficient current to permit the diode 20 to switch to its conducting state. Thus, the junctor control diode 20 operates along load line 5 of Fig. 1 when only one of its junctor terminals is marked but is controlled by the load line 4 when both of its terminals are marked.

When the diode 20 breaks down, the negative control pulse is passed through resistors 15 and 16 and applied across both of the negative resistance devices 11 and 12 to switch them on and to complete the desired connection. Once the connection is set up, the bias voltages are sufficient to maintain it upon termination of the marking and control pulses. Those crosspoints not utilized in the transmission path are then extinguished, leaving conducting only those crosspoints actually employed in the connection. The junctor 10 now maintains the connection by means of the −20 volt bias applied to the diode 20 through inductance 17. Current flows from ground at both ends of the network through the conducting crosspoint diodes and the junctor breakdown diodes to the −20 volt bias source to automatically latch the conducting path until the connection is to be terminated. To interrupt the connection, a positive pulse of 20 volts amplitude is applied from control source 32 through capacitor 18. This extinguishes conduction in the diode 20 which thereupon causes negative resistance devices 11 and 12 to cease conducting. As a result, the remaining crosspoint devices, such as 21 and 22, which are utilized in the connection, are turned off.

The particular resistance values of resistors 13 and 14 were selected in accordance with the characteristics of PNPN diode 20 to control its conduction state as described above. The particular voltage sources employed in the specific embodiment of the invention described were selected to provide the proper operation of this circuit. Other values of voltage and resistance may be selected as is known in the art to control similar functions of equivalent devices without departing from the scope of this invention.

It is to be understood that the above-described arrangements are illustrative of the principles of the invention. Numerous other arrangements may be devised by those skilled in the art without departing from the spirit and scope of the invention.

What is claimed is:

1. An electronic junctor circuit for a telephone switching network comprising a pair of terminals, a pair of voltage breakdown devices in series connection between said terminals for controlling a voice communication channel, another voltage breakdown device having a first electrode connected to a point betwen said series-connected voltage breakdown devices, means including a voltage source for applying marking potentials to said terminals, and control means including current limiting means in shunt with said pair of series-connected devices, said control means being connected to said other voltage breakdown device to breakdown said last-mentioned device only upon the simultaneous occurrence of said marking potentials at said terminals.

2. An electronic junctor circuit as set forth in claim 1 wherein means are provided for operating said series-connected voltage breakdown devices in the negative resistance region of their voltage-current characteristic curve to compensate for loss in said telephone switching network external to said junctor circuit.

3. An electronic junctor circuit as set forth in claim 1 wherein said connection between said series-connected voltage breakdown devices and said other voltage breakdown device comprises means for limiting the current in said devices.

4. In an electrical circuit for controlling the impedance between two terminals, means for applying voltage signals to said terminals, first and second bistable devices connected between said terminals, a third bistable device connected to said first and second bistable devices, and means for causing said third bistable device to attain its low-impedance state only upon the concurrent application of voltage signals at both of said terminals, said last-mentioned means including impedances connected between said third bistable device and each of said two terminals, whereupon said first and second bistable devices assume their low-impedance states upon said third bistable device attaining its low-impedance state.

5. An electrical circuit for controlling the impedance between a pair of terminals comprising a pair of voltage breakdown devices connected in series between said terminals, another voltage breakdown device having one electrode connected to a point between said series-connected voltage breakdown devices, means for applying priming potentials to said terminals, current limiting means connected in parallel with each of said series-connected devices to limit the current to said other voltage breakdown device to a value below that necessary for breakdown unless both of the said terminals are primed concurrently by said priming potentials, and control means connected to the other electrode of said other voltage breakdown device to break down said other device upon the priming of both of said terminals concurrently.

6. An electrical circuit for controlling the impedance between a pair of terminals comprising a pair of voltage breakdown devices connected in series between said terminals, current limiting means connected in parallel with each of said series-connected voltage breakdown devices, another voltage breakdown device having one electrode connected to a midpoint between said series-connected voltage breakdown devices to control the conduction state of said series-connected voltage breakdown devices, and means including a voltage source for applying marking potentials to said terminals, said current limiting means controlling the current to said other voltage breakdown device to permit the breakdown of said device only upon the concurrent application of said marking potentials to both of said terminals.

7. An electrical circuit as set forth in claim 6 wherein said current limiting means comprises a pair of resistors.

8. An electrical circuit for controlling the impedance between a pair of terminals comprising a pair of negative resistance voltage breakdown devices in series connection between said terminals, each said device having a resistor in parallel connection with it, a PNPN semiconductor diode having a first electrode connected to the midpoint between said negative resistance devices and a second electrode connected to a source of bias voltage, means including a pulse source for applying marking potentials to said terminals, and control means to break down said PNPN diode only upon the simultaneous occurrence of said marking potentials at both of said terminals, said control means also acting to cause said PNPN diode to revert to its nonconducting state.

9. An electrical circuit as set forth in claim 8 wherein said connection between said first electrode of said PNPN device and said midpoint between said negative resistance devices includes current limiting elements to protect said devices from excessive currents.

10. A switching network for an electronic switching system comprising a first plurality of voltage breakdown devices interconnected to form alternative paths between the ends of said network, a second plurality of voltage breakdown devices connected to intermediate points in each of said possible paths through said network, a bias voltage source connected to said network, a marking pulse source to break down certain of said devices in said first plurality from each end of said network toward the intermediate points, and control means including current limiting means connected between one of said second plurality of devices and spaced points along one of said alternative paths to break down one device of said second plurality only upon the application of potentials from said marking pulse source to said spaced points from opposite ends of said network, said last-mentioned device thereupon causing the devices of said first plurality between said spaced points to conduct and complete a transmission path between the ends of said network.

11. A telephone switching network for an electronic switching system comprising a plurality of series-connected semiconductor breakdown devices to provide transmission paths through said network, a plurality of shunt-connected semiconductor breakdown devices to control the impedance of certain of said series-connected devices, means including a pulse source for successively breaking down others of said series-connected devices, a plurality of resistor pairs each connecting one of said shunt-connected devices with an associated transmission path, each said shunt-connected device depending on current through both of its associated pair of resistors to permit it to switch to its low-impedance state, and control pulse means connected to said shunt-connected devices to break down one of said shunt-connected devices having both of its associated pair of resistors connected to conducting series-connected devices, said last-mentioned device, upon switching to its low-impedance state, causing said transmission path to be established.

12. A telephone switching network as set forth in claim 11 wherein means are provided for operating said impedance-controlled series-connected semiconductor breakdown devices in the negative resistance region of their voltage-current characteristic curve to provide loss compensation in said transmission paths.

13. A telephone switching network as set forth in claim 11 wherein said pair of resistors have a value with respect to the potentials supplied by said pulse means that the load line for said shunt-connected breakdown device circuit crosses the voltage-current characteristic of said last-mentioned device above its breakdown point only when pulses from said pulse source are applied to both of said resistors concurrently.

No references cited.